(12) United States Patent
El-Moussa et al.

(10) Patent No.: US 10,733,295 B2
(45) Date of Patent: Aug. 4, 2020

(54) MALWARE DETECTION IN MIGRATED VIRTUAL MACHINES

(71) Applicant: British Telecommunications Public Limited Company, London (GB)

(72) Inventors: Fadi El-Moussa, London (GB); Andreas Mauthe, London (GB); Angelos Marnerides, London (GB); Michael Watson, London (GB)

(73) Assignee: British Telecommunications Public Limited Company, London (GB)

( * ) Notice: Subject to any disclaimer, the term of this patent is extended or adjusted under 35 U.S.C. 154(b) by 269 days.

(21) Appl. No.: 15/541,128

(22) PCT Filed: Dec. 17, 2015

(86) PCT No.: PCT/EP2015/080244
§ 371 (c)(1),
(2) Date: Jun. 30, 2017

(87) PCT Pub. No.: WO2016/107753
PCT Pub. Date: Jul. 7, 2016

(65) Prior Publication Data
US 2017/0351861 A1    Dec. 7, 2017

(30) Foreign Application Priority Data

Dec. 30, 2014  (EP) .................... 14250125

(51) Int. Cl.
*G06F 21/56*  (2013.01)
*G06F 21/53*  (2013.01)
*G06F 9/455*  (2018.01)

(52) U.S. Cl.
CPC ........ *G06F 21/566* (2013.01); *G06F 9/45558* (2013.01); *G06F 21/53* (2013.01); *G06F 21/56* (2013.01); *G06F 2009/45591* (2013.01)

(58) Field of Classification Search
CPC .... G06F 21/566; G06F 9/45558; G06F 21/53; G06F 21/56; G06F 2009/45591
See application file for complete search history.

(56) References Cited

U.S. PATENT DOCUMENTS 8,713,631 B1    4/2014  Pavlyushchik
8,806,638 B1    8/2014  Mani
(Continued)

FOREIGN PATENT DOCUMENTS

EP    2 741 227 A1    6/2014
EP    2 750 070 A2    7/2014
(Continued)

OTHER PUBLICATIONS

Clemens Kolbitsch et al., "Effective and Efficient Malware Detection at the End Host," Jan. 2009, pp. 351-397. (Year: 2009).*
(Continued)

*Primary Examiner* — Luu T Pham
*Assistant Examiner* — Canh Le
(74) *Attorney, Agent, or Firm* — Patterson Thuente Pedersen, P.A.

(57) ABSTRACT

A malware detection system to detect malware in a virtual machine (VM), the system including a profile generator adapted to generate a profile of a deployment of the VM, the profile including execution characteristics of the deployment; a VM package generator to generate a VM package including: a VM descriptor describing a particular deployment of the VM; and an image of the particular deployment, the image including a representation of data stored for the particular deployment of the VM; and a malware identifier adapted to identify malware in a deployment of the VM responsive to the identification of a difference between profiles of multiple different deployments of the VM.

8 Claims, 5 Drawing Sheets

(56) References Cited

U.S. PATENT DOCUMENTS

| | | | |
|---|---|---|---|
| 8,813,234 B1 | 8/2014 | Bowers et al. | |
| 8,898,788 B1 | 11/2014 | Aziz et al. | |
| 8,910,238 B2 | 12/2014 | Lukacs et al. | |
| 9,535,727 B1* | 1/2017 | Jerbi | G06F 9/45533 |
| 9,671,816 B2 | 6/2017 | Berry | |
| 2004/0158741 A1 | 8/2004 | Schneider | |
| 2004/0230834 A1 | 11/2004 | McCallam | |
| 2005/0108562 A1 | 5/2005 | Khazan et al. | |
| 2007/0016953 A1 | 1/2007 | Morris et al. | |
| 2007/0089111 A1* | 4/2007 | Robinson | G06F 21/53 718/1 |
| 2007/0240222 A1 | 10/2007 | Tuvell et al. | |
| 2008/0320594 A1 | 12/2008 | Jiang | |
| 2009/0038008 A1* | 2/2009 | Pike | G06F 21/52 726/22 |
| 2009/0044024 A1 | 2/2009 | Oberheide et al. | |
| 2009/0055693 A1 | 2/2009 | Budko et al. | |
| 2010/0175108 A1 | 7/2010 | Protas | |
| 2011/0023118 A1 | 1/2011 | Wright | |
| 2011/0107330 A1* | 5/2011 | Freundlich | G06F 9/45558 718/1 |
| 2011/0167491 A1 | 7/2011 | Ruggerio | |
| 2011/0271279 A1* | 11/2011 | Pate | G06F 21/53 718/1 |
| 2013/0019277 A1* | 1/2013 | Chang | H04L 63/0218 726/1 |
| 2014/0149983 A1* | 5/2014 | Bonilla | G06F 9/45558 718/1 |
| 2014/0173740 A1 | 6/2014 | Albanese et al. | |
| 2015/0101055 A1 | 4/2015 | Tang et al. | |
| 2016/0021122 A1 | 1/2016 | Pevny | |
| 2017/0323113 A1 | 11/2017 | El-Moussa et al. | |
| 2017/0351860 A1 | 12/2017 | El-Moussa | |
| 2018/0053002 A1 | 2/2018 | El-Moussa et al. | |
| 2018/0054451 A1 | 2/2018 | El-Moussa et al. | |
| 2018/0060575 A1 | 3/2018 | El-Moussa et al. | |
| 2018/0060581 A1 | 3/2018 | El-Moussa et al. | |
| 2018/0060582 A1 | 3/2018 | El-Moussa et al. | |
| 2018/0091531 A1 | 3/2018 | El-Moussa et al. | |

FOREIGN PATENT DOCUMENTS

| | | |
|---|---|---|
| EP | 2 816 469 A1 | 12/2014 |
| WO | WO 2009/097610 A1 | 8/2009 |
| WO | WO 2012/087685 A1 | 6/2012 |
| WO | WO 2013/172750 A1 | 11/2013 |
| WO | WO 2015/128612 A1 | 9/2015 |
| WO | WO 2015/179020 A2 | 11/2015 |
| WO | WO 2016/034496 A1 | 3/2016 |
| WO | WO 2017/021153 A1 | 2/2017 |
| WO | WO 2017/021154 A1 | 2/2017 |
| WO | WO 2017/021155 A1 | 2/2017 |
| WO | WO 2017/109128 A1 | 6/2017 |
| WO | WO 2017/109129 A1 | 6/2017 |
| WO | WO 2017/167544 A1 | 10/2017 |
| WO | WO 2017/167545 A1 | 10/2017 |
| WO | WO 2018/033350 A1 | 2/2018 |
| WO | WO 2018/033375 A3 | 2/2018 |

OTHER PUBLICATIONS

Angelos K. Marnerides, "Malware Detection in the Cloud under Ensemble Empirical Mode Decomposition," 2015 IEEE, pp. 82-88. (Year: 2015).*
International Search Report for corresponding International Application No. PCT/EP2015/080244 dated Mar. 24, 2016; 3 pages.
Written Opinion of the International Searching Authority for corresponding International Application No. PCT/EP2015/080244 dated Mar. 24, 2016; 6 pages.
International Search Report and Written Opinion for PCT Application No. PCT/EP2015/080246 dated Mar. 14, 2016; 10 pages.
Tschorsch F., et al., "Bitcoin and Beyond: A Technical Survey on Decentralized Digital Currencies," International Association for Cryptologic Research, May 15, 2015, pp. 1-37.
DMTF Distributed Management Task Force, Inc.; "Open Virtualization Format Specification"; Document No. DSP0243; Jan. 12, 2010; 42 pages; Version: 1.1.0.
International Search Report and Written Opinion for PCT Application No. PCT/EP2016/082476 dated Feb. 9, 2017; 8 pages.
International Search Report and Written Opinion for PCT Application No. PCT/EP2016/082477 dated Feb. 22, 2017; 8 pages.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.
Anonymous, "Can BitCoin be a better DRM? BitcoinBeginners," retrieved from https://www.reddit.com/r/BitcoinBeginners/commentsll y5yh8/can bitcoinbe_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A M., "Mastering Bitcoin-Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Application and Filing Receipt for U.S. Appl. No. 15/677,288, filed Aug. 15, 2017, Inventor(s): El-Moussa et al.
Application and Filing Receipt for U.S. Appl. No. 15/677,298, filed Aug. 15, 2017, Inventor(s): El-Moussa et al.
Application and Filing Receipt for U.S. Appl. No. 15/677,312, filed Aug. 15, 2017, Inventor(s): El-Moussa et al.
Application and Filing Receipt for U.S. Appl. No. 15/677,322, filed Aug. 15, 2017, Inventor(s): El-Moussa et al.
Application and Filing Receipt for U.S. Appl. No. 15/677,336, filed Aug. 15, 2017, Inventor(s): El-Moussa et al.
Application and Filing Receipt for U.S. Appl. No. 15/677,363, filed Aug. 15, 2017, Inventor(s): El-Moussa et al.
Application and Filing Receipt for U.S. Appl. No. 16/065,665, filed Jun. 22, 2018, Inventor(s): El-Moussa et al.
Wang Z., "The Applications of Deep Learning on Traffic Identification," 2015.
Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.
Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.
Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Benders J.F., "Partitioning Procedures for Solving Mixed Variables Programming Problems," 1962, vol. 4, pp. 238-252.

(56) References Cited

OTHER PUBLICATIONS

Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff—Institute for Physics, May 2015, 9 pages.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
CVE Details The Ultimate Security Vulnerability Datasouce, "Current CVSS Score Distribution for All Vulnerabilities" retrieved from https://www.cvedetails.com/ on Jun. 28, 2018, 1 page.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Extended European Search Report for Application No. EP15179440.1, dated Feb. 10, 2016, 6 pages.
First.org, Inc., "Common Vulnerability Scoring System, V3 Development Update," available at www.first.org/cvss, CVSS v3.0 User Guide (v1.5), Jun. 2015; 15 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Frigault M., "Measuring Network Security Using Bayesian Network-Based Attack Graphs," The Concordia Institute of Information systems Engineering, Mar. 2010, 88 pages.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," Times Books, ISBN 0-8050-7 456-2, 2004, Jul. 14, 2005; 174 pages.
Hawkins, et al., "Why Neurons Have Thousands of Synapses, A Theory of Sequence Memory in Neocortex," Published in Frontiers in Neural Circuits (10 (2016) 1-13, doi:10.3389/fncir.2016.00023) and available from https://www.frontiersin.org/articles110.3389/fncir.2016.00023/full, retrieved on Mar. 28, 2018, Numenta Inc., Redwood City, CA, USA, Mar. 30, 2016, 13 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Search Report and Written Opinion for Application No. PCT/EP2015/080244, dated Mar. 24, 2016, 9 pages.
International Search Report and Written Opinion for Application No. PCT/EP2015/080246, dated Mar. 14, 2016, 10 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055095, dated Apr. 11, 2017, 10 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Adler M., "Threat Intelligence Visibility—the way forward," BT, 2015, available from www.globalservices.bt.com/uk/en/products/assure threat_monitoring.
Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
Munoz-Gonzalez, "Exact Inference Techniques for the Dynamic Analysis of Bayesian Attack Graphs," Imperial college, London, Oct. 2015, 14 pages.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenField1997.pdf, Dec. 24, 1996, 15 pages.
Plohmann D., et al., "Case study of the Miner Botnet", Cyber Conflict (CYCON), 2012 4th International Conference on Jun. 5, 2012, pp. 1-16.
International Search Report and Written Opinion for PCT Application No. PCT/EP2016/067308, dated Sep. 21, 2016, 8 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Skybox Security; Cybersecurity Management & Analytics retrieved from https://www.skyboxsecurity.com/ on Jul. 12, 2018, 7 pages.

(56) References Cited

OTHER PUBLICATIONS

Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.

OPNET Technologies Network Simulator I Riverbed, retrieved from https://www.riverbed.com/products/steelcentral/opnet.html?redirect=opnet on Jun. 28, 2018, 5 pages.

International Preliminary Report on Patentability for Application No. PCT/EP2015/080244, dated Jul. 13, 2017, 8 pages.

International Preliminary Report on Patentability for Application No. PCT/EP2015/080246, dated Jul. 13, 2017, 8 pages.

International Preliminary Report on Patentability for Application No. PCT/EP2016/067308, dated Feb. 15, 2018, 7 pages.

International Preliminary Report on Patentability for Application No. PCT/EP2016/067309, dated Feb. 15, 2018, 7 pages.

International Preliminary Report on Patentability for Application No. PCT/EP2016/067310, dated Feb. 15, 2018, 8 pages.

Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.

International Preliminary Report on Patentability for Application No. PCT/EP2017/055094, dated Oct. 11, 2018, 8 pages.

International Search Report and Written Opinion for Application No. PCT/EP2017/055094, dated May 15, 2017, 10 pages.

Application as filed for U.S. Appl. No. 16/065,637, filed 22 Jun. 3, 2018, Inventor(s): El-Moussa et al.

Application as filed for U.S. Appl. No. 16/086,042, filed Sep. 18, 2018, Inventor(s): El-Moussa et al.

Application as filed for U.S. Appl. No. 16/086,230, filed Sep. 18, 2018, Inventor(s): El-Moussa et al.

International Search Report and Written Opinion for PCT Application No. PCT/EP2017/068738 dated Oct. 9, 2017; 13 pages.

Fischer, et al.; "Training Restricted Boltzmann Machines: An Introduction", vol. 47, No. 1, Jun. 7, 2013, 27 pages.

International Search Report and Written Opinion for PCT Application No. PCT/EP2017/069272 dated Feb. 20, 2018; 13 pages.

Application as filed for U.S. Appl. No. 16/319,391, filed Jan. 21, 2019, Inventor(s): El-Moussa et al.

Application and Filing Receipt for U.S. Appl. No. 16/323,084, filed Feb. 4, 2019, Inventor(s): El-Moussa et al.

\* cited by examiner

MALWARE DETECTION IN MIGRATED VIRTUAL MACHINES

CROSS-REFERENCE TO RELATED APPLICATIONS

The present application is a National Phase entry of PCT Application No. PCT/EP2015/080244, filed on 17 Dec. 2015, which claims priority to EP Patent Application No. 14250125.3, filed on 30 Dec. 2014, which are hereby fully incorporated herein by reference.

TECHNICAL FIELD

The present disclosure relates to malware detection and, in particular, to the detection of malware for migrated virtual machines.

BACKGROUND

Historically, organizations and businesses developed or acquired bespoke or off-the-shelf software solutions for execution using dedicated computer hardware. Such software solutions find broad application in many varied areas of business such as: financial management; sales and order handling; record storage and management; human resource record management; payroll; marketing and advertising; internet presence, etc. The acquisition, management and maintenance of such software and hardware can require costly investment in systems development, management and revision—functions that can extend beyond the core business concerns of an organization.

As organizations increasingly seek to decouple such systems management from their core business processes to control costs, breadth of concern and liabilities, service offerings are provided to take the place of in-house systems. Computer systems are increasingly provided by third parties as services in the same way as utilities, a shift that has been partly facilitated by improvements in the availability of high-speed network connections allowing consuming businesses to access and use networked third party systems. Such systems can include substantially all aspects of a business computer system including hardware, operating systems software, file systems and data storage software including database applications and the like, middleware and transaction handling software, and commercial software. In this way consuming businesses can be relieved of concerns relating to the exact nature, arrangement and management of computing systems and focus resources elsewhere. The computing system is abstracted from the consuming business and can be logically thought of as a 'cloud' in which all system concerns are encapsulated and at least partly managed by a third party. Thus, such arrangements are known as 'cloud computing'.

Service providers can provide computing infrastructure on a service basis using hardware shared by multiple systems employing virtualization software. Such services can be described as virtualized computing environments in which applications can be deployed to execute within virtual machines executing in the virtualized environment. Computing environments are increasingly virtualized such that computing systems, operating systems and associated resources including hardware, networking, software and associated services are provided in a virtual manner. For example, systems can be deployed including operating systems, storage devices, virtual devices and drivers, applications and the like for execution in virtualized computing environments. A virtualized computing environment provides for the deployment of one or more virtual computer systems, known as virtual machines (VMs). A VM is a software or part-software implementation of a computer system capable of executing software and applications like a physical (or theoretical) machine. VMs execute in virtualized computing environments in which an underlying arrangement of physical computer system hardware and resources are abstracted by a virtualization service such as a hypervisor, emulator, operating system level virtualization component or a partitioned virtualized computing system.

A VM is deployed on the basis of a VM specification which defines the characteristics of a computing environment required for the deployment of the VM. For example a VM specification can define data storage, processor and network facilities required. Additionally, at least on first deployment of a VM, a VM specification can include a specification of the type, configuration and arrangement of software and services including operating systems, middleware, server software, data storage facilities such as databases etc. For example, VMs can be deployed based on specifications to cloud computing environments such as the BT Cloud Compute environment.

Once deployed it can be necessary to transfer or migrate a VM within or between virtualized computing environments. Such migration can be occasioned by a need for different or greater/fewer resources or a change of virtualized computing environment provider. For example, migration can occur within a single virtualized computing environment between partitions, nodes or clusters of the environment, or by simply re-deploying a VM within the same virtualized computing environment. Alternatively, migration can occur between virtualized computing environments such as between service providers of different computing environments or between different physical hardware environments within which virtualized computing environments (which may be different or identical to a source environment) exist.

Migration can be achieved by generating an image of a VM as one or more files, streams or other representations of a memory comprising the contents of all or a subset of memory and/or data stores associated with the VM in execution. For example, an image of a VM can be a disk image of one or more data storage devices installed and configured to constitute the VM in a particular virtualized environment. The image can further include runtime state of a VM, such as a copy, recall or dump of memory at all or a part of an address space of the VM in execution. The image can additionally include virtual processor information such as processor register states/values and the like. In this way a VM can be captured for transfer or migration such that the image can be copied, shared or otherwise transferred to a virtual computing environment in which the VM is to be deployed, further deployed or redeployed. Thus such images can capture the contents of storage devices for a VM or can extend to some or all of a state of the VM in execution.

A challenge when migrating VMs is to avoid the transfer or propagation of malicious software or malware including, inter alia: viruses; worms; viruses; Trojan horses; rootkits; grayware; unsolicited software; privacy-invasive software; spyware; adware; fraudulent dialers; and even joke programs. Where malware is installed in a VM then transfer or migration of the VM can include transfer of the malware. Where a VM is migrated to a new virtualized computing environment then the new environment can be susceptible to the detrimental effects of the malware.

Accordingly it would be beneficial to provide for the transfer or migration of a VM without the aforementioned disadvantages.

SUMMARY

The present disclosure accordingly provides, in a first aspect, a computer implemented malware detection method to detect malware in a virtual machine (VM), the method comprising: monitoring execution of a first deployment of the VM to generate a first profile including execution characteristics of the first deployment; generating a VM package including: a VM descriptor describing the first deployment; and an image of the first deployment including a representation of data stored for the first deployment; monitoring execution of a second deployment of the VM, the second deployment being based on the VM package, to generate a second profile including execution characteristics of the second deployment; and identifying malware in the second deployment responsive to the identification of a difference between the first and second profiles.

In an embodiment, identifying malware is responsive to the identification of a difference between the first and second profiles meeting or exceeding a predetermined degree of difference.

In an embodiment, the first deployment is a deployment to a first virtualized computing environment and the second deployment is a deployment to a second virtualized computing environment, the first and second environments being different computing environments such that the VM is migrated between the first and second environments.

In an embodiment, the VM package includes at least part of the first profile in order that at least part of the first profile is communicated, by way of the VM package, to the second environment for the identifying step at the second computing environment.

In an embodiment, the at least part of the first profile is inserted into the VM descriptor.

In an embodiment, the VM includes one or more software routines for undertaking the monitoring such that the monitoring of the first deployment and the monitoring of the second deployment are reliably consistent.

Preferably the VM includes one or more software routines for undertaking the identifying.

In an embodiment, the monitoring and/or identifying are undertaken by a hypervisor or virtual machine monitor in the or each virtualized computing environment.

In an embodiment, the profile includes characteristics of software processes of the VM in execution.

In an embodiment, the profile includes details of use of one or more data stores by processes of the VM in execution.

In an embodiment, the profile includes characteristics of network utilization by the VM in execution.

The present disclosure accordingly provides, in a second aspect, a malware detection system to detect malware in a virtual machine (VM), the system comprising: a profile generator adapted to generate a profile of a deployment of the VM, the profile including execution characteristics of the deployment; a VM package generator to generate a VM package including: a VM descriptor describing a particular deployment of the VM; and an image of the particular deployment, the image including a representation of data stored for the particular deployment of the VM; and a malware identifier adapted to identify malware in a deployment of the VM responsive to the identification of a difference between profiles of multiple different deployments of the VM.

The present disclosure accordingly provides, in a third aspect, a malware detection system to detect malware in a virtual machine (VM), the system comprising a processor and a data store wherein the processor is adapted to undertake the following: monitoring execution of a first deployment of the VM to generate a first profile including execution characteristics of the first deployment; generating a VM package including: a VM descriptor describing the first deployment; and an image of the first deployment including a representation of data stored for the first deployment; monitoring execution of a second deployment of the VM, the second deployment being based on the VM package, to generate a second profile including execution characteristics of the second deployment; identifying malware in the second deployment responsive to the identification of a difference between the first and second profiles.

The present disclosure accordingly provides, in a fourth aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION OF EMBODIMENTS

Figure 1:
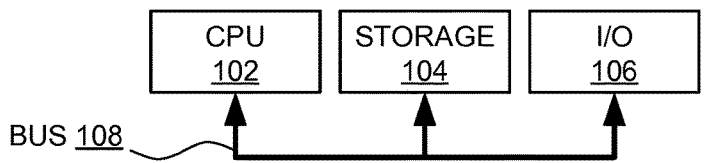
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

References to steps of operation of exemplary embodiments of the disclosure are enclosed in parentheses and depicted in broken circles in the figures.

Figure 2:
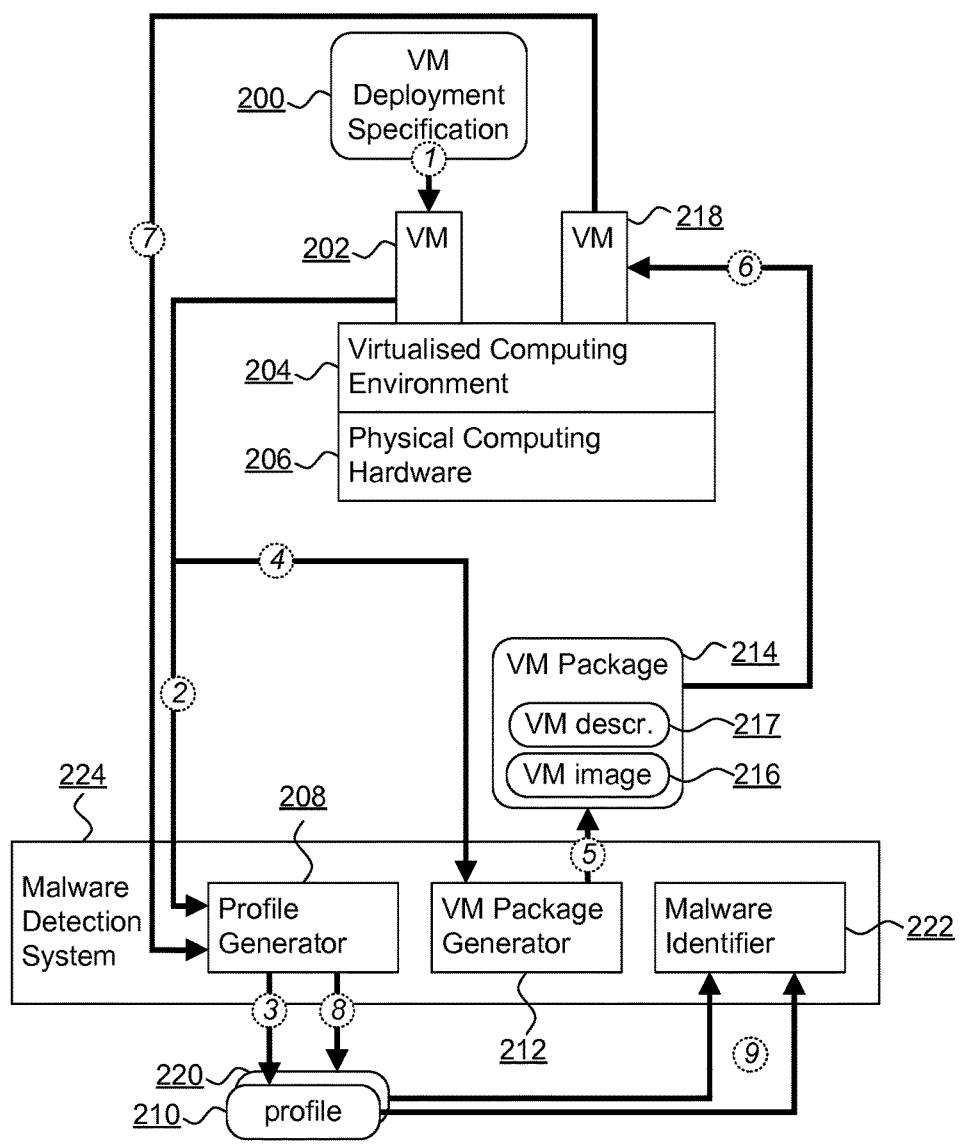
FIG. 2 is an exemplary schematic illustration of a malware detection system in accordance with embodiments of the present disclosure.

FIG. 2 is an exemplary schematic illustration of a malware detection system 224 in accordance with embodiments of the present disclosure. The malware detection system 224 is a hardware, software, firmware or combination component adapted to detect changes to execution characteristics of a VM following a migration of the VM that can correspond to malware installed, executing or residing in or with the migrated VM.

A VM is initially deployed (1) as a first VM deployment 202 based on a VM deployment specification 200. The deployment specification 200 can be or include deployment descriptor(s), deployment metadata, a virtual machine configuration specification, an architecture specification and the like. The deployment specification 200 can include a list or repository of hardware components for virtualization including processors, interfaces, storage devices, networking components etc. The deployment specification 200 can further include a list or repository of software components for installation, emulation, execution or deployment including: operating systems, device drivers, networking protocols, data storage software including data and/or object repositories, middleware, application software, industrial software, server software such as web, internet or data servers, software services such as security software, bespoke software and the like. The deployment specification 200 is used to instantiate, create, generate or configure the first VM deployment 202. The first VM deployment 202 can be achieved by the use of a virtual machine or cloud service deployment tool such as virtual machine management tools, management portals (such as Azure), cloud deployment toolkits (such as Eclipse), configuration management and/or development operations tools (Chef and Puppet), cloud service provider tools (such as Amazon Web Services tools) and the like.

Following deployment, the first VM deployment 202 executes in a virtualized computing environment 204 ultimately operating on or in conjunction with physical computing hardware 206 which can include centralization or distributed physical computing hardware. Notably, one or more further layers of virtualization can exist between the first VM deployment 202 and the physical computing hardware 206, as will be apparent to those skilled in the art.

In use, the first VM deployment 202 is migrated to a second VM deployment 218, during and/or after which the malware detection system 224 is operable to identify potential malware existing in the second VM deployment 218. The malware detection system 224 includes a profile generator 208, a VM package generator 212 and a malware identifier 222, each of which are software, hardware, firmware or combination components. While the generator 208, generator 212 and identifier 222 are depicted as separate and discrete components they may alternatively be combined into one or more combination components or alternatively further composed of other components that may be discrete or shared components such as functions, libraries, procedures, objects and the like. The malware detection system 224 is depicted as entirely implemented outside the VM deployments 202, 218, the virtualized computing environment 204 and the physical computing hardware 206. For example, the malware detection system 224 can be provided by a computing device, apparatus or virtualized machine operable in communication with one or more of the virtualized computing environment 204, physical computing hardware 206 and VM deployments 202, 218. Such communication can be via a hardware or software interface or a wired or wireless network connection, any or all of which may be physical or virtualized such as in a virtualized computing environment.

Alternatively, the malware detection system 224 can be provided partly or entirely within any or multiple of the virtualized computing environment 204, the physical computing hardware 206, and/or one or more of the VM deployments 202, 218. Examples of such alternative arrangements are described below with reference to FIGS. 3 to 5.

The profile generator 208 is adapted to generate a profile of a deployment of a VM such that the profile includes a summary, account, model, map, description, measurements or other representation of one or more execution characteristics of the deployment. For example, the profile generator 208 can monitor the use of virtualized computing resources by a VM deployment such as the utilization of any or all of execution mechanisms such as processors, processes, threads, functions, routines and the like. Additionally or alternatively the profile generator 208 can monitor the use of interfaces such as network interfaces, network communication, transmitted or received data via a network, software or virtualized hardware interfaces such as communications or virtualized device interfaces, interfaces between software components such as application interfaces including application programming interfaces, inter-process communications interfaces and the like. Additionally or alternatively the profile generator 208 can monitor memory and data storage facilities used and consumed by the deployed VM including the consumption of virtualized memory stores such as the extent, rate and nature of consumption (which can include the nature of data stored therein), where such memory stores can include virtualized memory, storage devices and the like.

The monitoring of use of virtualized computing resources can include the monitoring of the presence, consumption, instantiation, generation, activation, invocation or existence of resources, such as the addition of new processors, processes, threads and the like, or the instantiation of new networking, software or virtualized hardware interfaces, or the generation of new data stores, virtualized storage devices and the like. Further, the monitoring of use of resources can include monitoring over a period of time, at particular discrete times, or at relative times such as during a start-up, shutdown, peak-load, moderate-load, average-load and other time slots, periods or event triggers as will be apparent to those skilled in the art. In this way the profile generator 208 generates a profile 210 for a deployed virtual machine that includes execution characteristics of the deployed virtual machine.

The level and extent of such monitoring can be provided by a privileged mode of operation of a process, thread or execution stream constituting all or part of the profile generator 208 within a physical or virtualized execution environment such as the virtualized computing environment 204 or the physical computing hardware 206. In one embodiment, all or part of the profile generator is implemented within or in conjunction with the virtualized computing environment 204 to enjoy the privileged mode of operation associated with a hypervisor or virtual machine manager. Alternatively, all or part of the profile generator is implemented within a deployed VM itself such as a privileged process of the VM operating with or within an operating system of the VM, such profile generators could, in some embodiments, additionally be implemented to cooperate, collaborate, interface or function with the virtualized computing environment 204 to employ facilities or services of the virtualized computing environment 204 such as hypervisor or virtual machine manager functions, services and/or facilities giving secure and privileged access to the execution characteristics of VMs deployed therein or therewith.

The VM package generator 212 is adapted to generate a VM package 214 for a deployed VM such that the deployed VM can be migrated within a virtualized computing environment or between virtualized computing environments. The VM package 214 is a logical package including a VM image 216 as a data store of a state of a deployed VM, and a VM descriptor 217 including a definition of characteristics or attributes of the deployed VM to assist with or facilitate the migration of the deployed VM. Thus, using the VM package 214 a deployed VM can be redeployed within the same, or to a different, virtualized computing environment. In one embodiment the VM image is a disk image of a storage device of a deployed VM including the contents of at least part of, and in some embodiments all of, the storage device. Thus software installed for a deployed VM is included in the disk image in its installed state. In an alternative embodiment the disk image further includes runtime state information for a deployed VM such as an image or dump of a memory of the VM and/or processor state information including register content, instruction pointer values, program counter value, cache state and the like. In one embodiment the VM descriptor is comprised of one or more data files or memory areas including descriptive data describing a deployed VM, such as a mark-up language file (e.g. XML) having data and/or metadata defined therein. For example, the VM descriptor can include a descriptive file in an Open Virtualization Format (OVF) as specified by the Distributed Management Task Force (DMTF).

In an embodiment, the VM package 214 is constituted by one or more files such as a VM image file and an OVF file. While the VM package 214 is described as a package it will be appreciated by those skilled in the art that the elements of the VM package 214 need not be specifically tied or bound together in a package form, and can instead be considered a package without being so tied or bound by virtue of their commonality in relating to a particular deployed VM. Thus a VM image and an OVF file need not be packaged together though when used together can constitute a VM package 214. Nevertheless an OVF file preferably refers to a particular VM image.

The VM package generator 212 accordingly obtains information required for generating the VM package 214 and generates the VM package 214 by, for example, writing, creating or otherwise generating the constituents of the VM package 214. In one embodiment the VM package generator 212 is adapted to access one or more physical or virtual data stores storing software, files and data for a deployed VM and generating a VM image 216 from such data store(s). For example, the VM package generator 212 can be wholly or partly implemented as a function, feature of facility of a virtualized computing environment with which a deployed VM executes. Alternatively, the VM package generator 212 can employ an interface, facility, service function or other feature of such a virtualized computing environment. Further, in one embodiment, the VM package generator 212 is adapted to generate the VM descriptor 217 based wholly or partly on a VM deployment specification for a deployed VM. Additionally or alternatively, the VM package generator 212 generates the VM descriptor 217 based on information obtained from or in respect to a deployed VM, such as: virtualized architecture information from a hypervisor or virtual machine manager; an analysis of a deployed VM by components operating within or with a virtualized computing environment; or from an introspection interface of a virtualized computing environment, a hypervisor, a virtual machine manager or a deployed VM itself.

The malware identifier 222 is adapted to identify potential or actual malware in a VM deployment based on a profile corresponding to each of a first 202 and second 218 deployments of a VM. Thus a profile 210 of execution characteristics for a first VM deployment 202 is compared to a profile 220 of execution characteristics for a second VM deployment 218, the second VM deployment corresponding to a migration of the VM in the first VM deployment 202. The comparison of the profiles 210, 220 can identify differences in the execution characteristics of the first 202 and second 218 deployments, and such differences can identify malware in the second VM deployment 218. For example, execution characteristics for a first VM deployment 202 can be monitored and recorded soon after the VM is deployed (1). Such execution characteristics are recorded in a first profile 210 for multiple resources such as: a level or extent of processor utilizaiton; a number and constitution of processes in execution; rates of received and transmitted network traffic; and the like. Subsequently, the VM is migrated to a second VM deployment 218 and such execution characteristics are monitored and recorded again in a second profile 220. The malware identifier 222 then compares the first 210 and second 220 profiles to identify differences corresponding to malware present in the second VM deployment 218 and absent in the first VM deployment 202. Such malware that is detected is malware that can present in the VM between monitoring of the first VM deployment 202 and monitoring of the second VM deployment 218 and is advantageously identified on redeployment of the VM by migration to instantiate the second VM deployment 218. The comparison of the profiles 210, 220 can be undertaken in such a manner that literal identity of the profiles 210, 220 is not required to indicate that malware is not installed. Rather, some degree of difference between the profiles 210, 220 can be defined as a threshold degree of difference, beyond which the second VM deployment 218 is identified as containing malware. A degree of difference can be defined in terms of the measures of execution characteristics used to generate the profile, such as a differential level or extent of processor utilization; a differential number and constitution of processes in execution; differential rates of received and transmitted network traffic; and the like. Notably, differences need not relate only to measures, counts or rates monitored in deployed VMs but can additionally or alternatively relate to differences in the nature of the profile, such as the names, types, classes, categories of processes and/or threads executing, and/or the processes with which network communication takes place. For example, where a comparison of the profiles 210, 220 shows an identification of one or more new executing processes in a second VM deployment 218 that are not present in a first VM deployment 202 and associated with network traffic in the second VM deployment 218 that is absent in the first VM deployment 202, the network traffic being directed to port(s) opened by one or more of the new processes, such differences between the profiles 210, 220 for the first 202 and second 218 VM deployments can be predetermined to constitute a degree of difference that indicates malware in the second VM deployment 218. Such predeterminations of degrees or types of difference can be predefined for access or retrieval by the malware identifier 222. Such degrees of difference can be associated with either or both the first 202 and second 218 VM deployments, the virtualized computing environment 204 and/or the malware detection system 224.

For effective malware detection by the malware identifier 222 it is important that the process and/or mechanism for generating the profiles 210, 220 for the first VM deployment 202 and the second VM deployment 218 are consistent such that the profiles 210, 220 are readily compared without encumbrance by artifacts arising from different methods or arrangements employed for the profile generator 208 for each of the first 202 and second 218 VM deployments. In one embodiment the same profile generator 208 is used to generate the profile for the first VM deployment 202 as is used to generate the profile for the second VM deployment 218. Notably, the "same" profile generator 208 does not necessarily mean the same instance or invocation of a profile generator 208: a copy, further instance or invocation of the profile generator 208 will suffice. Thus it is not necessary that the same instance or invocation of a malware detection system 224 that is used in respect of a first VM deployment 202 (to generate a profile 210 and VM package 214) need also be used in respect of a second VM deployment 218, provided the profile generation arising from both malware detection systems 224 are compatible such that the comparison of profiles by the malware identifier 222 is not so encumbered.

Further, in arrangements where a malware detection system 224 is provided for each of the first VM deployment and the second VM deployment, the malware detection systems need not be identical (while the profile generators 208 of such systems are to be compatible such that their respective generated profiles are comparable as described above). This non-identity is acceptable because a malware identifier 222 is operable only once both a first 210 and second 220 profiles are generated, thus a malware detection system 224 associated with a first VM deployment may operate without, or without use of, a malware identifier 222, while a malware detection system 224 associated with a second VM deployment will operate with a malware identifier 222.

Thus, in use, the execution of the first VM deployment 202 is monitored (2) by a profile generator 208 which generates (3) a first profile 210 including execution characteristics of the first VM deployment 202. Subsequently, the VM package generator 212 accesses (4) the first VM deployment 202 to generate (5) a VM package 214 including a VM descriptor 217 describing the first VM deployment 202 and a VM image 216. The VM package is used to deploy (6) a second VM deployment 218 to the virtualized computing environment 204 (or a different/alternative environment, see FIGS. 3 to 5). Subsequently the profile generator 208 monitors (7) the second VM deployment 218 and generates (8) a second profile 220 including execution characteristics of the second VM deployment 218. The malware identifier 222 identifies malware in the second deployment responsive to the identification of one or more differences between the first 210 and second 220 profiles.

In one embodiment the profile generator 208 is adapted to monitor the execution characteristics of a first VM deployment 202 once the first VM deployment 202 is deployed in order to generate a first profile 210 as a baseline profile corresponding to the execution characteristics of the first VM deployment 202. For example, the profile generator 208 can be arranged to generate the first profile 210 some predetermined time after deployment of the first VM deployment 202. Alternatively, the first profile 210 can be generated when a processing state, throughput or transactional state of the first VM deployment 202 satisfies a certain criterion (or criteria) such as a steady state of operation of the first VM deployment 202, a threshold level of activity (processor, process, data storage, network activity etc.) of the first VM deployment 202 and the like.

Figure 3:
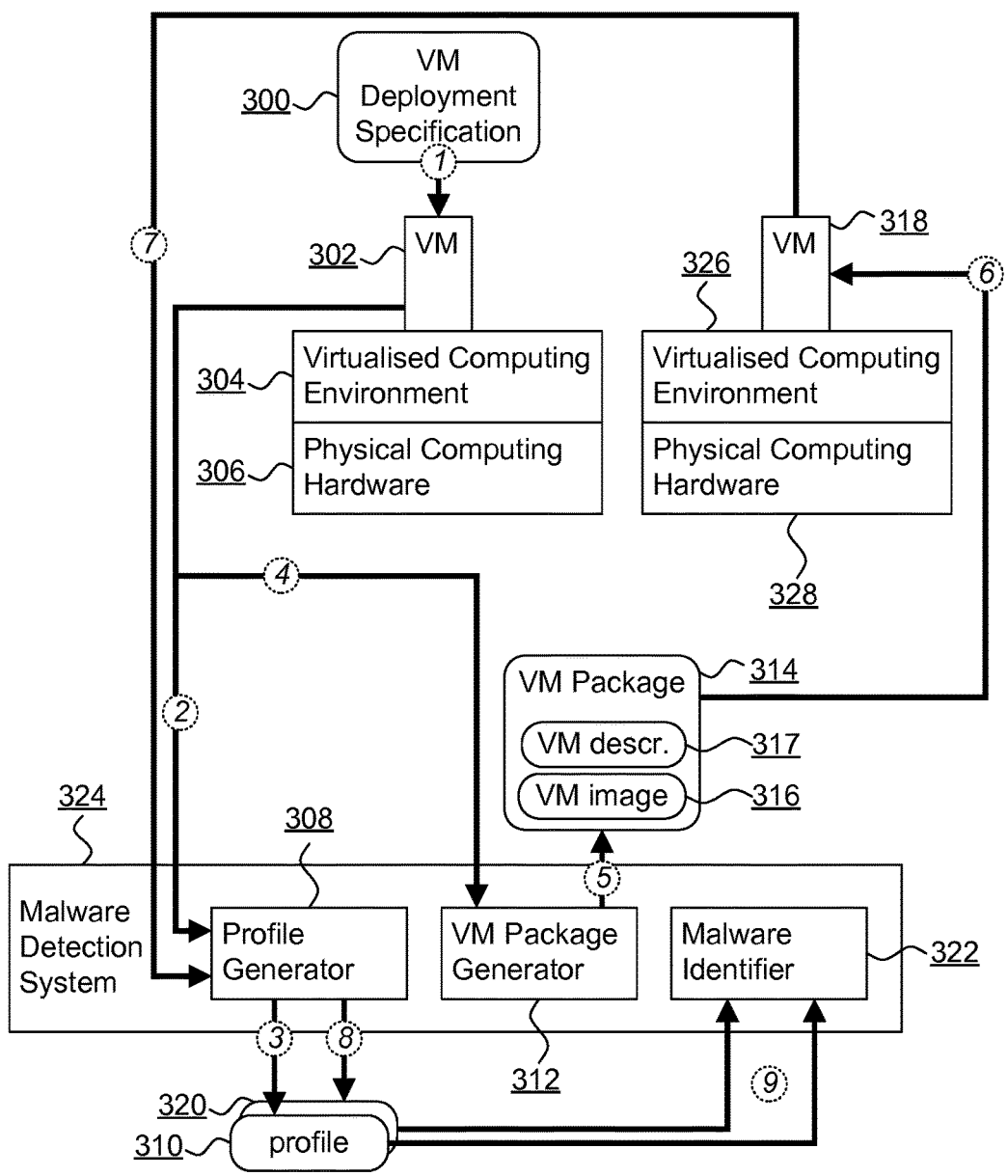
FIG. 3 is a second exemplary schematic illustration of a malware detection system in accordance with embodiments of the present disclosure.

FIG. 3 is a second exemplary schematic illustration of a malware detection system 324 in accordance with embodiments of the present invention. Many of the features of FIG. 3 are identical to those described above with respect to FIG. 2 and these will not be repeated here. In the arrangement of FIG. 3 the VM package 314 is used to redeploy a VM as a second VM deployment 318 in a second virtualized computing environment 326 that is different to a first virtualized computing environment 304 for the first VM deployment 302. The second virtualized computing environment 326 can execute with different physical computing hardware 328 such that the second VM deployment 318 executes outside the environment of the first VM deployment 302. Arrangements such as that of FIG. 3 arise where a VM is migrated between virtualized computing environments such as between service providers such as cloud service providers or in disaster recovery or protection situations.

Figure 4:
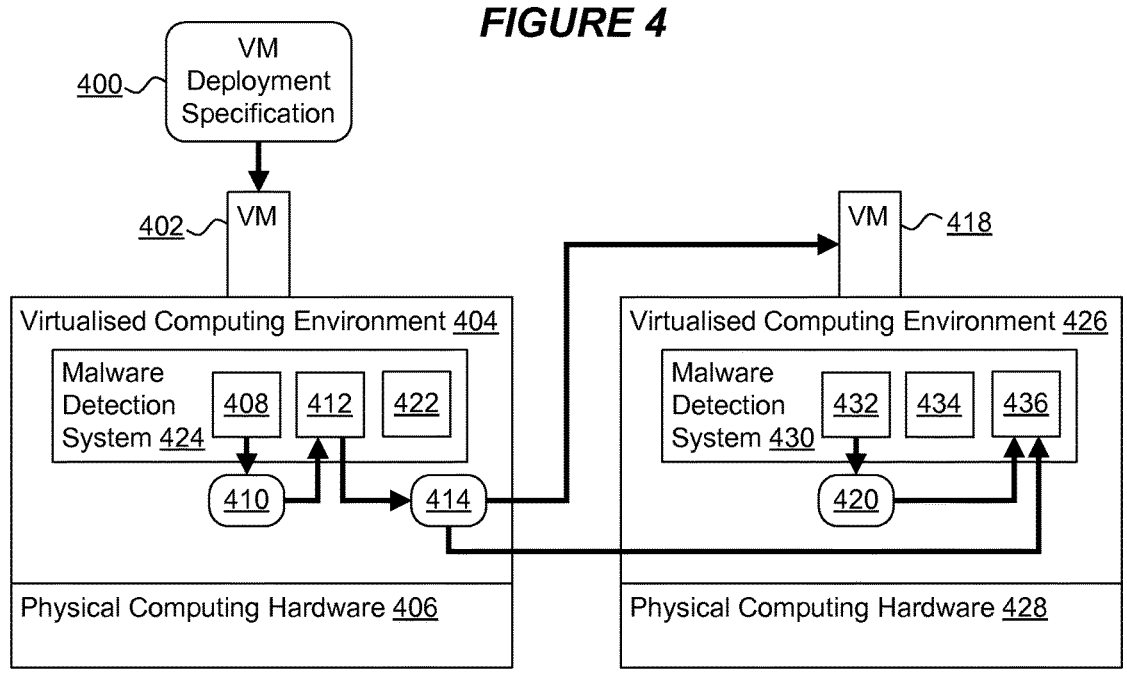
FIG. 4 is a third exemplary schematic illustration of a malware detection system in accordance with embodiments of the present disclosure.

FIG. 4 is a third exemplary schematic illustration of a malware detection system in accordance with embodiments of the present disclosure. Many of the features of FIG. 3 are identical to those described above with respect to FIGS. 2 and 3 and these will not be repeated here. The arrangement of FIG. 4 illustrates the possibility of including a malware detection system, substantially as hereinbefore described, as a function, feature or facility of a virtualized computing environment 404, 426. FIG. 4 illustrates disparate virtualized computing environments 404, 426 for each of the first 402 and second 418 VM deployments such that a VM is migrated between the first 402 and second 418 environments. Alternatively, a single virtualized computing environment may be employed where a VM is migrated within the virtualized computing environment, the environment including the malware detection system 424 as illustrated in FIG. 4.

In the arrangement of FIG. 4 multiple malware detection systems 424, 430 are provided such that one malware detection system 424 is provided at a first virtualized computing environment 404 for a first VM deployment 402 and one malware detection system 430 is provided at a second virtualized computing environment 426 for a second VM deployment 418. Accordingly it the profile generators 408, 432 of each environment are adapted to generate profiles 410, 420 that are readily comparable, such as by using identical profile generation software or functions. Thus, in use, the execution of the first VM deployment 402 is monitored by the profile generator 408 which generates a first profile 410 including execution characteristics of the first VM deployment 402. Subsequently, a VM package generator 412 accesses the first VM deployment 402 to generate a VM package 414. The VM package is used to deploy a second VM deployment 418 in a second virtualized computing environment 426. The profile generator 432 of the malware detection system 430 for the second virtualized computing environment 426 monitors the second VM deployment 418 and generates a second profile 420 including execution characteristics of the second VM deployment 418. The malware identifier 436 of the malware detection system 430 receives the first profile 410 and the second profile 420 and identifies malware in the second VM deployment 418 responsive to the identification of one or more differences between the first 410 and second 420 profiles.

Notably, the malware identifier 436 accesses the first profile 410 for the first VM deployment 402. In a preferred embodiment the VM package 414 includes at least part of the first profile 410 in order that at least part of the first profile is communicated, by way of the VM package, to the second virtualized computing environment 426. In this way the malware detection system 430 of the second virtualized computing environment 426, and specifically the malware identifier 436, can access at least part of the first profile 410 for comparison with the second profile 420. For example, at least part of the first profile 410 can be included in an OVF file of the VM package 414 as metadata such as new XML metadata within the OVF file. In an embodiment, the entire first profile 410 is communicated to the second virtualized computing environment 426 by inclusion of the first profile 410 in the VM package 414.

Figure 5:
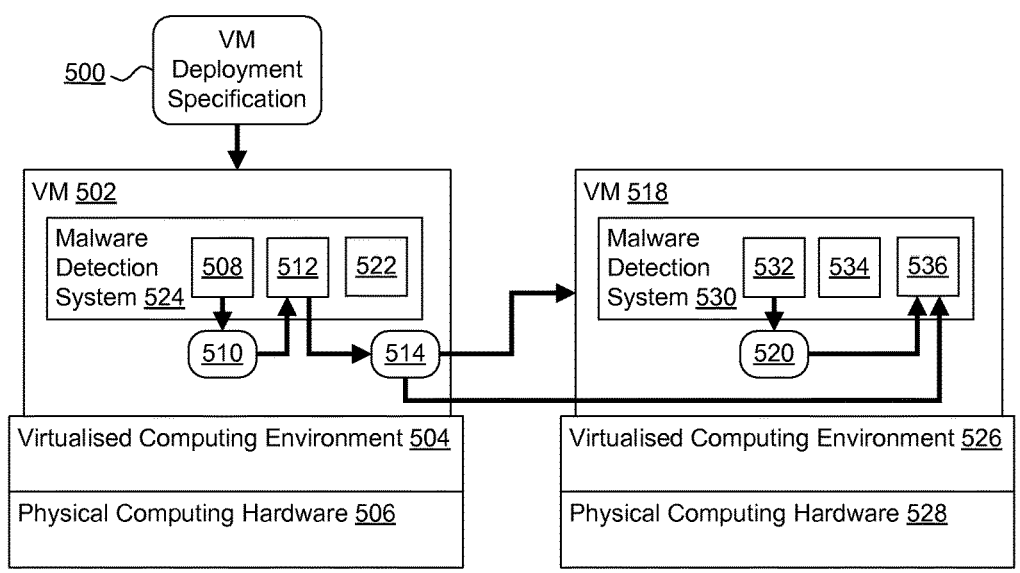
FIG. 5 is a fourth exemplary schematic illustration of a malware detection system in accordance with embodiments of the present disclosure.

FIG. 5 is a fourth exemplary schematic illustration of a malware detection system in accordance with embodiments of the present disclosure. Many of the features of FIG. 3 are identical to those described above with respect to FIGS. 2 to 4 and these will not be repeated here. In the arrangement of FIG. 5 multiple malware detection systems 524, 530 are provided such that one malware detection system 524 is provided entirely or partly within, as part of or executing with a first VM deployment 502. A second malware detection system 530 is provided within, as part of or executing with a second VM deployment 518. Thus arrangements in accordance with FIG. 5 include a malware detection system 524, 530 as part of the software deployed for a VM. Such malware detection systems 524, 530 can undertake their functions (including the monitoring functions and profile generation functions) with reference to the operating environment of a deployed VM while residing within that operating environment. Additionally or alternatively each malware detection system 524, 530 can operate in conjunction with tools, facilities or functions of its respective virtualized computing environment 504, 526, so as to provide privileged access to execution characteristics of the VM deployments 502, 518.

Figure 6:
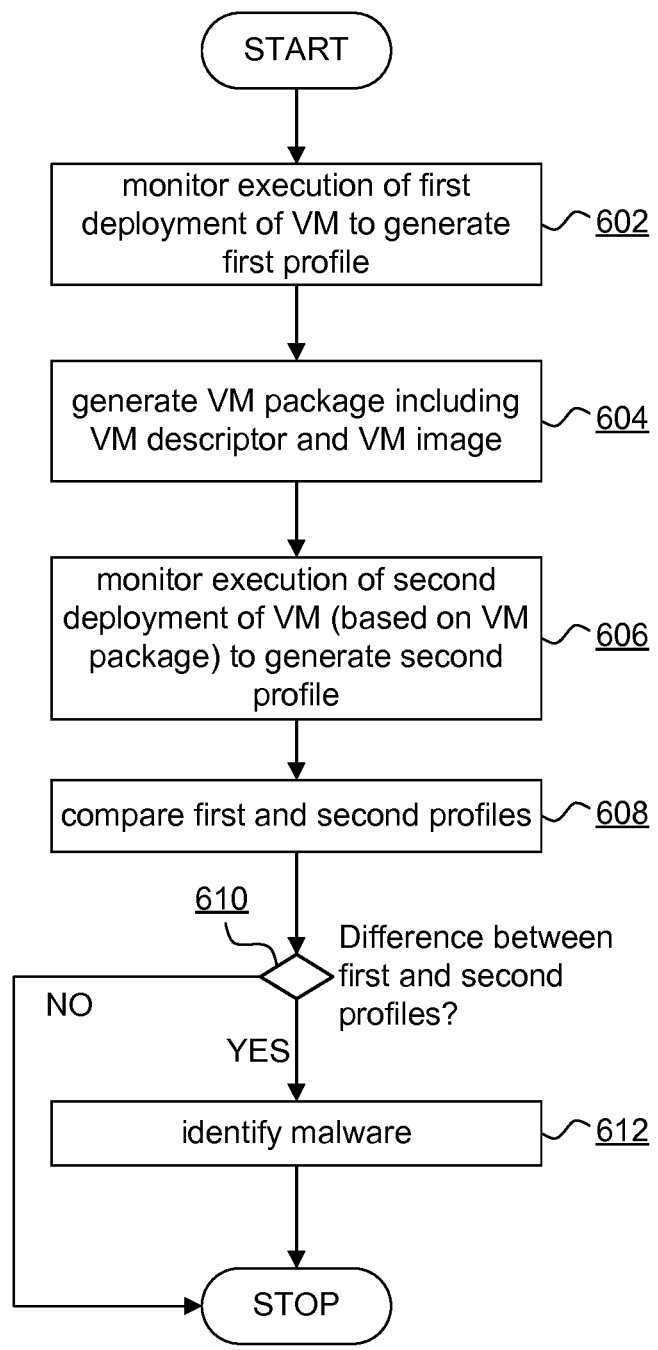
FIG. 6 is a flowchart of a computer implemented malware detection method in accordance with embodiments of the present disclosure.

FIG. 6 is a flowchart of a computer implemented malware detection method in accordance with embodiments of the present disclosure. The method will be described with reference to the features of FIG. 2 though it will be appreciated that the features of any of FIGS. 2 to 5 could equally apply. Initially, at 602, the method monitors execution of a first VM deployment 202 to generate a first profile 210. At 604 the method generates a VM package 214 including a VM descriptor 217 and a VM image 216. At 606 the method monitors execution of a second VM deployment 218 (that was deployed based on the VM package 214) to generate a second profile 220. At 608 the method compares the first 210 and second 220 profiles and, where a difference between the profiles is identified at 610, the method identifies malware at 612. Notably, the identification of a difference at 610 can be the identification of a degree of difference exceeding a predetermined threshold degree of difference.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented malware detection method to detect malware in a virtual machine (VM), the method comprising:
    monitoring execution of a first deployment of the VM to generate a first profile including execution characteristics of the first deployment;
    migrating the first deployment of the VM to a second deployment of the VM by generating a VM package including:
        a VM descriptor describing the first deployment, and
        an image of the first deployment including a representation of data stored for the first deployment,
        wherein the first deployment is a deployment to a first virtualized computing environment and the second deployment is a deployment to a second virtualized computing environment, the first and second environments being different computing environments such that the VM is migrated between the first and second environments, wherein the VM package includes at least part of the first profile in order that at least part of the first profile is communicated, by way of the VM package, to the second environment for identifying at the second computing environment, and wherein the at least part of the first profile is inserted into the VM descriptor;
    monitoring execution of a second deployment of the VM, the second deployment being based on the generated VM package, to generate a second profile including execution characteristics of the second deployment; and
    responsive to the identification of a difference between the first and second profiles meeting or exceeding a predetermined degree of difference, identifying malware in the second deployment responsive to the identification of a difference between the first and second profiles,
    wherein at least one of the monitoring or the identifying is undertaken by a hypervisor or virtual machine monitor in the or each virtualized computing environment.

2. The method of claim 1 wherein the VM includes one or more software routines for undertaking the monitoring such that the monitoring of the first deployment and the monitoring of the second deployment are reliably consistent.

3. The method of claim 2 wherein the VM includes one or more software routines for undertaking the identifying.

4. The method of claim 1 wherein at least one of the first profile or the second profile includes characteristics of software processes of the VM in execution.

5. The method of claim 1 wherein at least one of the first profile or the second profile includes details of use of one or more data stores by processes of the VM in execution.

6. The method of claim 1 wherein at least one of the first profile or the second profile includes characteristics of network utilization by the VM in execution.

7. A malware detection system to detect malware in a virtual machine (VM), the system comprising:
  a processor and a data store, the data store comprising at least one non-transitory computer-readable storage medium, wherein the processor is adapted to undertake the following:
    monitoring execution of a first deployment of the VM to generate a first profile including execution characteristics of the first deployment;
    migrating the first deployment of the VM to a second deployment of the VM by generating a VM package including:
      a VM descriptor describing the first deployment, and
      an image of the first deployment including a representation of data stored for the first deployment,
      wherein the first deployment is a deployment to a first virtualized computing environment and the second deployment is a deployment to a second virtualized computing environment, the first and second environments being different computing environments such that the VM is migrated between the first and second environments, wherein the VM package includes at least part of the first profile in order that at least part of the first profile is communicated, by way of the VM package, to the second environment for identifying at the second computing environment, and wherein the at least part of the first profile is inserted into the VM descriptor;
    monitoring execution of a second deployment of the VM, the second deployment being based on the generated VM package, to generate a second profile including execution characteristics of the second deployment; and
    responsive to the identification of a difference between the first and second profiles meeting or exceeding a predetermined degree of difference, identifying malware in the second deployment responsive to the identification of a difference between the first and second profiles,
    wherein at least one of the monitoring or the identifying is undertaken by a hypervisor or virtual machine monitor in the or each virtualized computing environment.

8. A non-transitory computer-readable storage medium storing a computer program element comprising computer program code to, when loaded into a computer system and executed thereon, cause the computer system to implement a malware detection method to detect malware in a virtual machine (VM) by:
  monitoring execution of a first deployment of the VM to generate a first profile including execution characteristics of the first deployment;
  migrating the first deployment of the VM to a second deployment of the VM by generating a VM package including:
    a VM descriptor describing the first deployment, and
    an image of the first deployment including a representation of data stored for the first deployment,
    wherein the first deployment is a deployment to a first virtualized computing environment and the second deployment is a deployment to a second virtualized computing environment, the first and second environments being different computing environments such that the VM is migrated between the first and second environments, wherein the VM package includes at least part of the first profile in order that at least part of the first profile is communicated, by way of the VM package, to the second environment for identifying at the second computing environment, and wherein the at least part of the first profile is inserted into the VM descriptor;
  monitoring execution of a second deployment of the VM, the second deployment being based on the generated VM package, to generate a second profile including execution characteristics of the second deployment; and
  responsive to the identification of a difference between the first and second profiles meeting or exceeding a predetermined degree of difference, identifying malware in the second deployment responsive to the identification of a difference between the first and second profiles,
  wherein at least one of the monitoring or the identifying is undertaken by a hypervisor or virtual machine monitor in the or each virtualized computing environment.

* * * * *